United States Patent
Yukawa

(10) Patent No.: US 10,046,753 B2
(45) Date of Patent: Aug. 14, 2018

(54) VEHICLE HYBRID SYSTEM

(71) Applicant: Panasonic Intellectual Property Management Co., Ltd., Osaka (JP)

(72) Inventor: Junichi Yukawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 118 days.

(21) Appl. No.: 15/032,657

(22) PCT Filed: Jan. 13, 2015

(86) PCT No.: PCT/JP2015/000107
§ 371 (c)(1),
(2) Date: Apr. 28, 2016

(87) PCT Pub. No.: WO2015/125407
PCT Pub. Date: Aug. 27, 2015

(65) Prior Publication Data
US 2016/0272187 A1    Sep. 22, 2016

(30) Foreign Application Priority Data

Feb. 20, 2014    (JP) .................. 2014-030316

(51) Int. Cl.
*B60W 20/10*    (2016.01)
*B60K 6/50*    (2007.10)
(Continued)

(52) U.S. Cl.
CPC ............... *B60W 20/10* (2013.01); *B60K 6/26* (2013.01); *B60K 6/383* (2013.01); *B60K 6/387* (2013.01);
(Continued)

(58) Field of Classification Search
None
See application file for complete search history.

(56) References Cited

U.S. PATENT DOCUMENTS

| | | | | |
|---|---|---|---|---|
| 5,549,524 A | * | 8/1996 | Yang | B60K 6/38 477/3 |
| 2010/0258367 A1 | | 10/2010 | Venturi | |
| 2014/0011631 A1 | | 1/2014 | Cimatti | |

FOREIGN PATENT DOCUMENTS

| | | |
|---|---|---|
| EP | 1792800 A2 | 6/2007 |
| EP | 2682293 A1 | 1/2014 |

(Continued)

OTHER PUBLICATIONS

The Extended European Search Report dated Feb. 10, 2017 for the related European Patent Application No. 15751997.6.
(Continued)

*Primary Examiner* — Mussa A Shaawat
*Assistant Examiner* — Kyung J Kim
(74) *Attorney, Agent, or Firm* — Greenblum & Bernstein, P.L.C.

(57) ABSTRACT

A vehicle hybrid system includes a transmission mechanically coupled with an engine, a drive shaft mechanically coupled with the transmission, a rotation-transmitting part coupled with the drive shaft, a power connecting-disconnecting part coupled with the drive shaft via the rotation-transmitting part, a motor generator mechanically coupled with the power connecting-disconnecting part, and a directional power transmission part for transmitting power in a direction from the motor generator to the engine to drive the engine and for not transmitting power in a direction from the engine to the motor generator to drive the motor generator. This vehicle hybrid system has high efficiency.

7 Claims, 16 Drawing Sheets

(51) Int. Cl.

| | | |
|---|---|---|
| *B60K 6/26* | (2007.10) | |
| *B60W 10/02* | (2006.01) | |
| *B60K 6/387* | (2007.10) | |
| *B60W 10/08* | (2006.01) | |
| *B60W 10/06* | (2006.01) | |
| *B60K 6/442* | (2007.10) | |
| *B60K 6/383* | (2007.10) | |
| *B60K 6/48* | (2007.10) | |
| *B60K 6/547* | (2007.10) | |
| *B60L 7/14* | (2006.01) | |
| *B60L 11/14* | (2006.01) | |
| *B60L 15/20* | (2006.01) | |
| *B60W 20/40* | (2016.01) | |
| *B60W 20/00* | (2016.01) | |
| *B60W 30/18* | (2012.01) | |

(52) U.S. Cl.
CPC .............. *B60K 6/442* (2013.01); *B60K 6/48* (2013.01); *B60K 6/50* (2013.01); *B60K 6/547* (2013.01); *B60L 7/14* (2013.01); *B60L 11/14* (2013.01); *B60L 15/20* (2013.01); *B60L 15/2009* (2013.01); *B60L 15/2054* (2013.01); *B60W 10/02* (2013.01); *B60W 10/06* (2013.01); *B60W 10/08* (2013.01); *B60W 20/40* (2013.01); *B60K 2006/268* (2013.01); *B60K 2006/4808* (2013.01); *B60K 2006/4825* (2013.01); *B60K 2006/4833* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/507* (2013.01); *B60L 2260/26* (2013.01); *B60L 2270/145* (2013.01); *B60W 20/00* (2013.01); *B60W 2030/1809* (2013.01); *B60W 2030/18081* (2013.01); *B60Y 2200/92* (2013.01); *B60Y 2300/182* (2013.01); *B60Y 2300/192* (2013.01); *B60Y 2300/91* (2013.01); *B60Y 2400/427* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/906* (2013.01); *Y10S 903/914* (2013.01); *Y10S 903/93* (2013.01)

(56) References Cited

FOREIGN PATENT DOCUMENTS

| | | |
|---|---|---|
| JP | 1-095944 | 4/1989 |
| JP | 2004-122925 | 4/2004 |
| JP | 2005-271669 | 10/2005 |
| JP | 3890803 B | 3/2007 |
| JP | 2011-501713 | 1/2011 |
| JP | 2012-240623 | 12/2012 |
| JP | 5169433 B | 3/2013 |
| JP | 5395115 B | 1/2014 |

OTHER PUBLICATIONS

International Search Report of PCT application No. PCT/JP2015/000107 dated Apr. 21, 2015.

* cited by examiner

FIG. 7B

| Speed of Vehicle (km/h) | 0 | 2 | 4 | 10 | 20 | 40 | 60 | 80 | 100 |
|---|---|---|---|---|---|---|---|---|---|
| Transmission 13 | 1st Speed | 1st Speed | 1st Speed | 1st Speed | 2nd Speed | 3rd Speed | 4th Speed | 5th Speed | 5th Speed |
| Lock-Up Clutch 51 (Slip Ratio of Torque Converter) | Disengage | Disengage (3.0) | Disengage (2.0) | Disengage (1.5) | Disengage (1.2) | Disengage (1.2) | Engage | Engage | Engage |
| Rotation Speed (rpm) | | | | | | | | | |
| Point A: Engine 11 (Intrinsic Rotation Speed) | 0 | 600 (200) | 800 (400) | 1500 (1000) | 1200 (1000) | 1800 (1500) | 1500 | 1600 | 2000 |
| Point B: Drive Shaft 15 | 0 | 50 | 100 | 250 | 500 | 1000 | 1500 | 2000 | 2500 |
| Point D: End 21A of Clutch 21 | 0 | 150 | 300 | 750 | 1500 | 3000 | 4500 | 6000 | 2500 |
| Point E: End 17B of One-Way Clutch 17 | 0 | 600 | 60 | 150 | 300 | 600 | 900 | 1200 | 0 |
| Point C: Motor Generator 19 | 0 | 3000 | 300 | 750 | 1500 | 3000 | 4500 | 6000 | 0 |
| Clutch 21 | Disengage | Disengage | Engage | Engage | Engage | Engage | Engage | Engage | Disengage |
| Rotation Speeds RA and RE at Points A and B | RA=RE | RA=RE | RA>RE | RA>RE | RA>RE | RA>RE | RA>RE | RA>RE | RA>RE |
| One-Way Clutch 17 | Engage | Engage | Disengage | Disengage | Disengage | Disengage | Disengage | Disengage | Disengage |
| Motor Generator 19 | Start Engine 11 | Start Engine 11 | Assist Drive Shaft 15 | Assist Drive Shaft 15 | Assist Drive Shaft 15 | Assist Drive Shaft 15 | Stop | Stop | Stop |

FIG. 8B

| Speed of Vehicle (km/h) | | 0 | 2 | 4 | 10 | 20 | 40 | 60 | 80 | 100 |
|---|---|---|---|---|---|---|---|---|---|---|
| Transmission 13 | | Neutral | Neutral | Neutral | 1st Speed | 2nd Speed | 3rd Speed | 4th Speed | 5th Speed | 5th Speed |
| Lock-Up Clutch 51 | | - | - | - | Disengage | Disengage | Disengage | Engage | Engage | Engage |
| Rotation Speed (rpm) | | | | | | | | | | |
| | Point A: Engine 11 | 0 | 0 | 0 | 150 ~750 | 300 ~1000 | 600 ~1500 | 1500 | 1600 | 2000 |
| | Point B: Drive Shaft 15 | 0 | 50 | 100 | 250 | 500 | 1000 | 1500 | 2000 | 2500 |
| | Point D: End 21A of Clutch 21 | 0 | 150 | 300 | 750 | 1500 | 3000 | 4500 | 6000 | 2500 |
| | Point E: End 17B of One-Way Clutch 17 | 0 | 0 | 0 | 150 | 300 | 600 | 900 | 1200 | 0 |
| | Point C: Motor Generator 19 | 0 | 0 | 0 | 750 | 1500 | 3000 | 4500 | 6000 | 0 |
| Clutch 21 | | Disengage | Disengage | Disengage | Engage | Engage | Engage | Engage | Engage | Disengage |
| Rotation Speeds RA and RE at Points A and E | | RA=RE | RA=RE | RA=RE | RA≧RE | RA≧RE | RA≧RE | RA>RE | RA>RE | RA>RE |
| One-Way Clutch 17 | | Engage | Engage | Engage | Engage/Disengage | Engage/Disengage | Engage/Disengage | Disengage | Disengage | Disengage |
| Motor Generator 19 | | Halt | Halt | Halt | Re-generation | Re-generation | Re-generation | Re-generation | Re-generation | Halt |

VEHICLE HYBRID SYSTEM

This application is a U.S. national stage application of the PCT international application No.PCT/JP2015/000107 filed on Jan. 13, 2015, which claims the benefit of foreign priority of Japanese patent application No. 2014-030316 filed on Feb. 20, 2014, the contents all of which are incorporated herein by reference.

TECHNICAL FIELD

The present invention relates to a vehicle hybrid system including an engine and a motor generator.

BACKGROUND ART

FIG. 14 is a schematic view of a power train system of conventional hybrid vehicle 100 including an engine and a motor generator disclosed in PTL 1.

As shown in FIG. 14, an output shaft of engine 101 is connected to an input shaft of motor generator 103 via torque capacity-variable clutch 105 (an engine-side clutch). An output shaft of motor generator 103 is connected to an input shaft of automatic transmission 107. Tires 111 are connected to an output shaft of automatic transmission 107 via differential gear 109. One of torque capacity-variable clutches in automatic transmission 107 which perform different power transmission in response to a shift state is used as clutch 113 (a transmission-side clutch). Automatic transmission 107 combines power of engine 101 input via clutch 105 and power input from motor generator 103, and outputs the combined power to tires 111.

CITATION LIST

Patent Literature

PTL 1: Japanese Patent No. 5169433

SUMMARY

A vehicle hybrid system is configured to be used in a vehicle including an engine installed thereto. The vehicle hybrid system includes an engine installed to a vehicle, a transmission mechanically coupled with the engine, a drive shaft mechanically coupled with the transmission, a rotation-transmitting part coupled with the drive shaft, a power connecting-disconnecting part coupled with the drive shaft via the rotation-transmitting part, a motor generator mechanically coupled with the power connecting-disconnecting part, and a directional power transmission part for transmitting power in a direction from the motor generator to the engine to drive the engine and for not transmitting power in a direction from the engine to the motor generator to drive the motor generator.

Another vehicle hybrid system includes a transmission mechanically coupled with the engine, a drive shaft mechanically coupled with the transmission, a transmission-output-side rotation-transmitting part coupled with the drive shaft, a first power connecting-disconnecting part mechanically coupled with the drive shaft via the transmission-output-side rotation-transmitting part, a motor generator mechanically coupled with the first power connecting-disconnecting part, a second power connecting-disconnecting part mechanically coupled with the motor generator, and a transmission-input-side rotation-transmitting part mechanically coupling between the second power connecting-disconnecting part and the engine.

These vehicle hybrid systems have high efficiency.

BRIEF DESCRIPTION OF DRAWINGS

FIG. 7B illustrates states of parts of the vehicle hybrid system according to Embodiment 1.
FIG. 8B illustrates states of parts of the vehicle hybrid system according to Embodiment 1.

DETAIL DESCRIPTION OF PREFERRED EMBODIMENTS

Exemplary Embodiment 1

Figure 1:
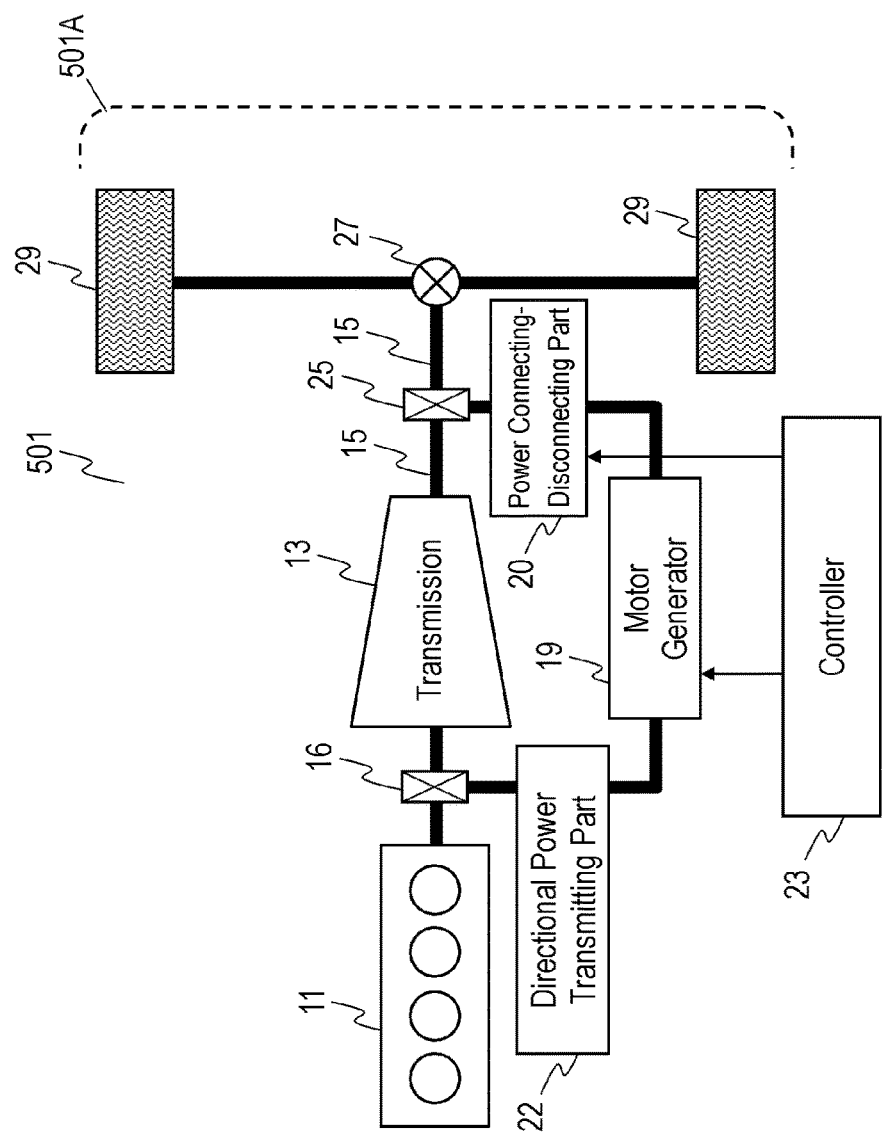
FIG. 1 is a schematic view of a vehicle hybrid system according to Exemplary Embodiment 1.
Figure 2:
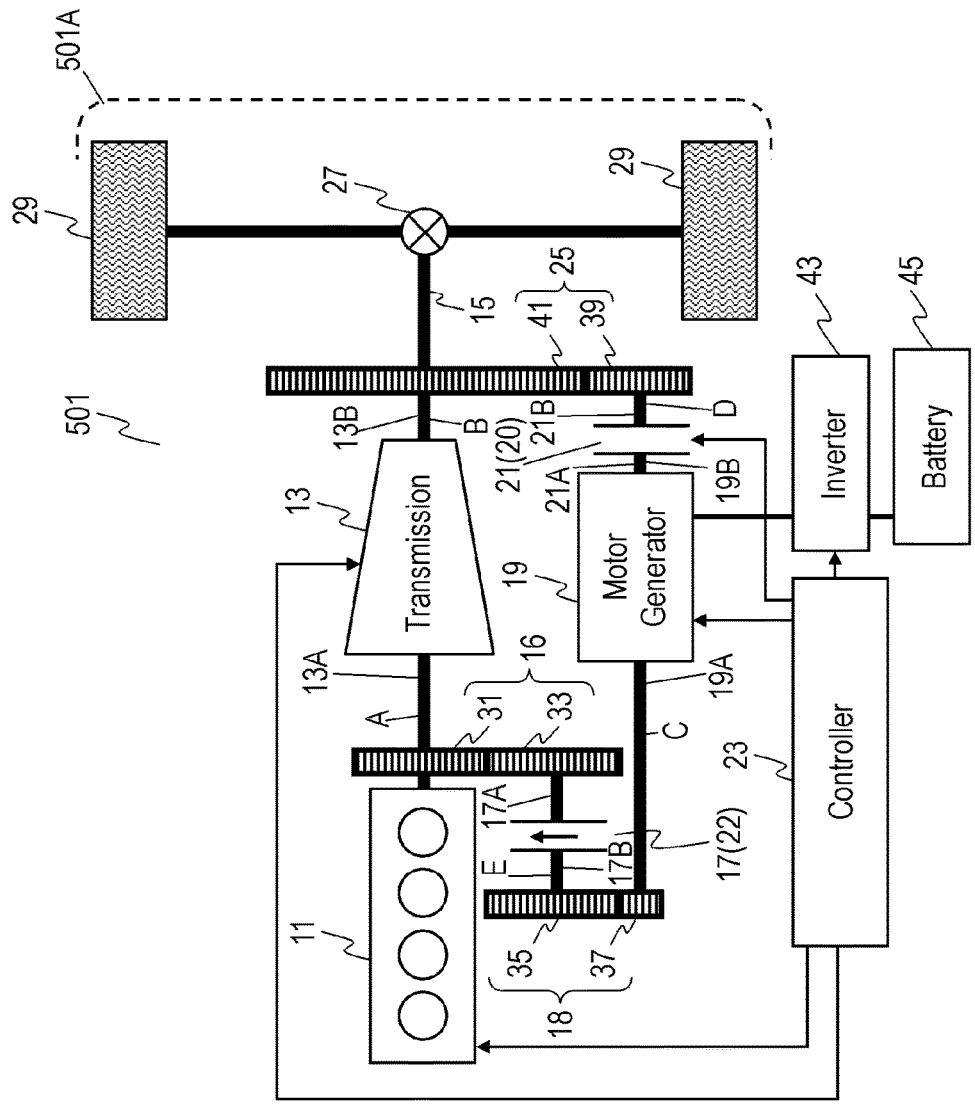
FIG. 2 is a schematic view of the vehicle hybrid system according to Embodiment 1.

FIGS. 1 and 2 are schematic views of vehicle hybrid system 501 according to Exemplary Embodiment 1.

As shown in FIG. 1, vehicle hybrid system 501 includes engine 11 installed to vehicle 501A, transmission 13 mechanically coupled with engine 11, drive shaft 15 mechanically coupled with transmission 13, motor generator 19 mechanically coupled with drive shaft 15 via both rotation-transmitting part 25 and power connecting-disconnecting part 20, directional power transmission part 22 and rotation-transmitting part 16 both which mechanically couple between motor generator 19 and engine 11, controller 23 electrically coupled with both motor generator 19 and power connecting-disconnecting part 20. Directional power transmission part 22 is configured to transmit power in a direction from motor generator 19 to engine 11 to drive the engine while not to transmit power in a direction from engine 11 to motor generator 19 to drive the motor generator.

In vehicle hybrid system 501, transmission 13 and motor generator 19 are disposed in parallel with each other with respect to both drive shaft 15 and an output of engine 11. This configuration allows controller 23 to control power connecting-disconnecting part 20 and motor generator 19 in power running and regeneration. Such control allows motor generator 19 to be directly coupled with drive shaft 15 while engine 11 can be started. This configuration provides efficient regeneration and power running while avoiding a loss in transmission 13, hence providing high fuel efficiency.

Figure 14:
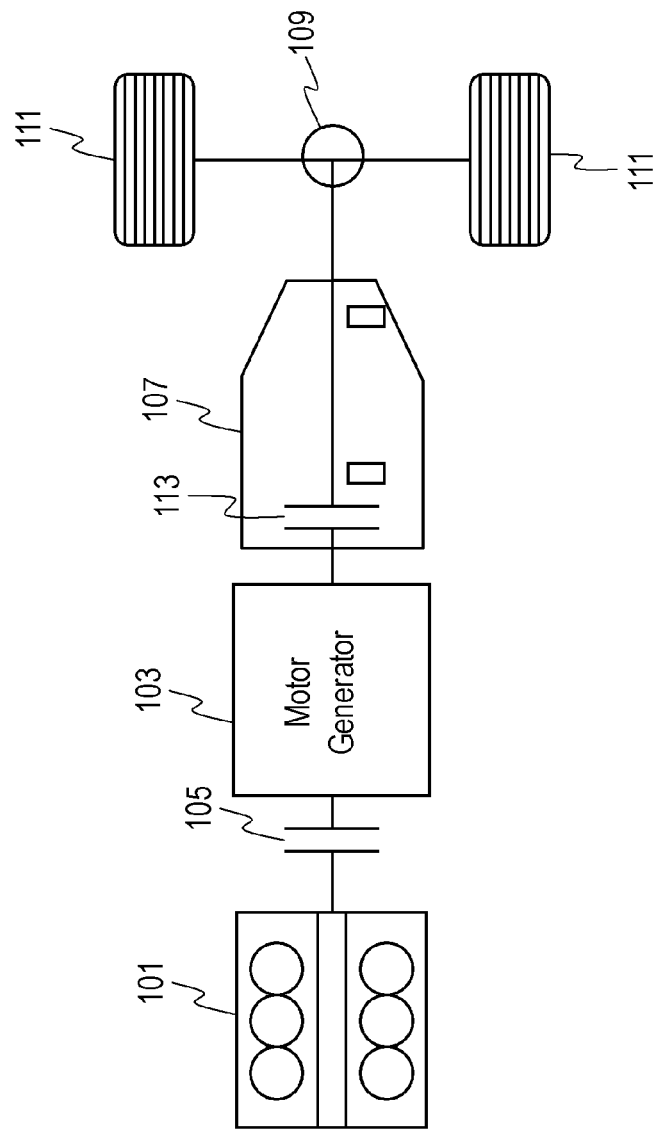
FIG. 14 is a schematic view of a power train system of a conventional hybrid vehicle.

In conventional hybrid vehicle 100 shown in FIG. 14, power of engine 101 and power input from motor generator 103 are combined via automatic transmission 107, and the combined power is output to tires 111. In this configuration, both the power of engine 101 and the power of motor generator 103 are input to automatic transmission 107. A loss in transmission 107 influences both the efficiency of power running and regeneration of motor generator 103. For this reason, the use of a continuously variable transmission or an automatic transmission with a torque converter can hardly provide high fuel efficiency.

A configuration and operations of vehicle hybrid system 501 according to Embodiment 1 will be described below.

Transmission 13 includes input side 13A and output side 13B, and converts a rotational speed at input side 13A into a rotational speed at output side 13B. As shown in FIG. 2, engine 11 is mechanically coupled with input side 13A of transmission 13. According to this embodiment, transmission 13 is a five-speed automatic transmission which includes a neutral stage and five transmission stages consisting of a first speed, a second speed, a third speed, a fourth speed, and a fifth speed. In the configuration and operations of vehicle hybrid system 501 according to Embodiment 1 described below, transmission 13 is not necessarily the five-speed automatic transmission, and may be a continuously variable transmission or a manual transmission.

Output side 13B of transmission 13 is mechanically coupled with tires 29 via drive shaft 15 and differential gear 27.

Gear 31 is coupled between engine 11 and input side 13A of transmission 13. Gear 31 is engaged with gear 33. Gears 31 and 33 constitute rotation-transmitting part 16. The gear ratio of gear 31 to gear 33 is 1:1.

According to Embodiment 1, directional power transmission part 22 is one-way clutch 17. One-way clutch 17 includes one end 17A and other end 17B which can be mechanically engaged and disengaged with each other. One end 17A of one-way clutch 17 is mechanically coupled with gear 33 of rotation-transmitting part 16. While directional power transmission part 22 is not electrically coupled with controller 23, the engaging and disengaging between one end 17A and other end 17B are automatically controlled in accordance with a direction and rotation speeds of one end 17A and other end 17B of one-way clutch 17. Other end 17B of one-way clutch 17 is mechanically coupled with gear 35. Gear 35 is engaged with gear 37. Gears 35 and 37 serving as a transmission part for changing the rotation speed constitute rotation-transmitting part 18. According to Embodiment 1, a gear ratio of gear 35 to gear 37 is 5:1.

Directional power transmission part 22 is not necessarily one-way clutch 17, and may be a mechanical two-way clutch. In this case, the two-way clutch can transmit power in a direction from motor generator 19 to engine 11 to drive the engine while the clutch cannot transmit power in a direction from engine 11 to motor generator 19 to drive the motor generator. According to Embodiment 1, however, one-way clutch 17 can sufficiently perform the required function, and the one-way clutch has a simpler structure than the two-way clutch. For this reason, directional power transmission part 22 is preferably implemented by one-way clutch 17.

Motor generator 19 is a double-shaft motor generator including one end 19A and other end 19B. One end 19A of motor generator 19 is mechanically coupled with gear 37. Accordingly, one end 19A of motor generator 19 is mechanically coupled with engine 11 via rotation-transmitting part 18, one-way clutch 17, and rotation-transmitting part 16.

According to Embodiment 1, power connecting-disconnecting part 20 is implemented by clutch 21. Clutch 21 includes one end 21A and other end 21B which can be mechanically engaged and disengaged with each other. One end 21A of clutch 21 is mechanically coupled with other end 19B of motor generator 19. Power connecting-disconnecting part 20 is not necessarily clutch 21, and may be a clutch, such as an electrically-controlled two-way clutch, including one end 21A and other end 21B which are mechanically engaged and disengaged under control of an external signal. An electrically-controlled two-way clutch may be suitably used in a case that high-speed responsivity is required.

Other end 21B of clutch 21 is mechanically coupled with gear 39. Gear 39 is engaged with gear 41. Gears 39 and 41 serving as a transmission part for changing the rotation speed constitute rotation-transmitting part 25. According to Embodiment 1, a gear ratio of gear 39 to gear 41 is 1:3. Gear 41 is coupled with drive shaft 15. Other end 19B of motor generator 19 is mechanically coupled with drive shaft 15 via clutch 21 and rotation-transmitting part 25.

Input side 13A of transmission 13 is mechanically coupled with one end 19A of motor generator 19 via one-way clutch 17 while output side 13B of transmission 13 is mechanically coupled with other end 19B of motor generator 19 via clutch 21.

Both of rotation-transmitting part 18 and rotation-transmitting part 25 do not have a gear ratio of 1:1, thus each functioning as a transmission part to change a rotation speed. Therefore, according to Embodiment 1, the transmission part to change a rotation speed is disposed in each of both coupling paths, that is, one is a path from engine 11 via directional power transmission part 22 (one-way clutch 17) to motor generator 19 while the other is a path from motor generator 19 via power connecting-disconnecting part 20 (clutch 21) to drive shaft 15. The gear ratios of these transmission parts may be appropriately determined in accordance with rotation characteristics of motor generator 19, engine 11, and transmission 13. The configuration is not necessarily the configuration described above. In accordance with the rotation characteristics described above, the transmission part to change the rotation speed is disposed in at least one of two coupling paths, that is, one is the path from engine 11 via directional power transmission part 22 to motor generator 19 while the other is the path from motor generator 19 via power connecting-disconnecting part 20 to drive shaft 15. Even in this case, the configuration can provide the same effects through an operation which will be described later.

The configuration may not necessarily include the transmission part depending on the characteristics of motor generator 19, engine 11, and transmission 13. However, since these components often have differences in characteristics, the transmission part is preferably used in the practical configuration as to offset their differences in characteristics with each other.

Figure 3:
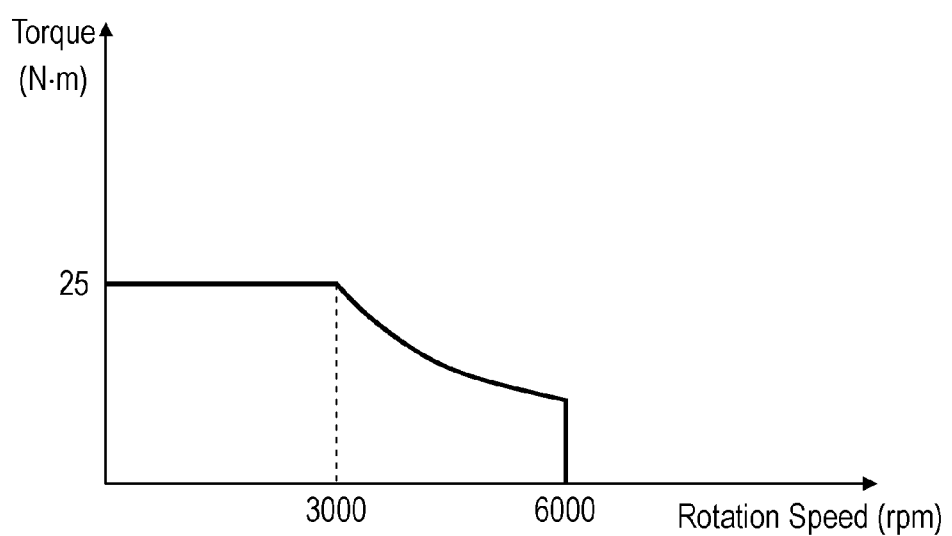
FIG. 3 illustrates correlation characteristics between torque and a rotation speed of a motor generator of the vehicle hybrid system according to Embodiment 1.

Motor generator 19 can not only rotate ends 19A and 19B to generate a driving force upon having electric power supplied thereto, but also generate electric power upon having end 19A or 19B rotated with a rotational force externally supplied thereto. FIG. 3 illustrates correlation characteristics between a rotation speed and a torque generated by motor generator 19 upon functioning as a motor according to Embodiment 1. In the case that motor generator 19 drives as a motor, the generator operates as follows: The motor generator generates the maximum torque of 25 N·m while the rotation speed is smaller than 3000 rpm. The motor generator gradually reduces the torque as the rotation speed rises to a speed not smaller than 3000 rpm. The motor generator outputs a constant power at the rotation speed ranging from 3000 rpm to 6000 rpm. The upper limit of the rotation speed is 6000 rpm. The motor generator is prevented from operating as a motor when the rotation speed reaches 6000 rpm.

Motor generator 19 can thus perform driving assistance (power running) of drive shaft 15 during traveling, and perform regeneration during braking in response to the traveling status of vehicle 501A. In order to perform exchanging of electric power during the regeneration and power running, motor generator 19 is electrically coupled via inverter 43 with battery 45 for storing the regenerated electric power.

Controller 23 is electrically coupled with engine 11, transmission 13, motor generator 19, clutch 21, and inverter 43. Controller 23 can acquire statuses of these devices and control their operations. Controller 23 is implemented by a microcomputer and a peripheral circuit including a memory. Then, controller 23 is also coupled with other in-vehicle apparatuses installed to vehicle 501A, thereby performing operations, such as the acquisition of signals of an acceleration pedal and a brake pedal, concerning the traveling of vehicle 501A.

Figure 4:
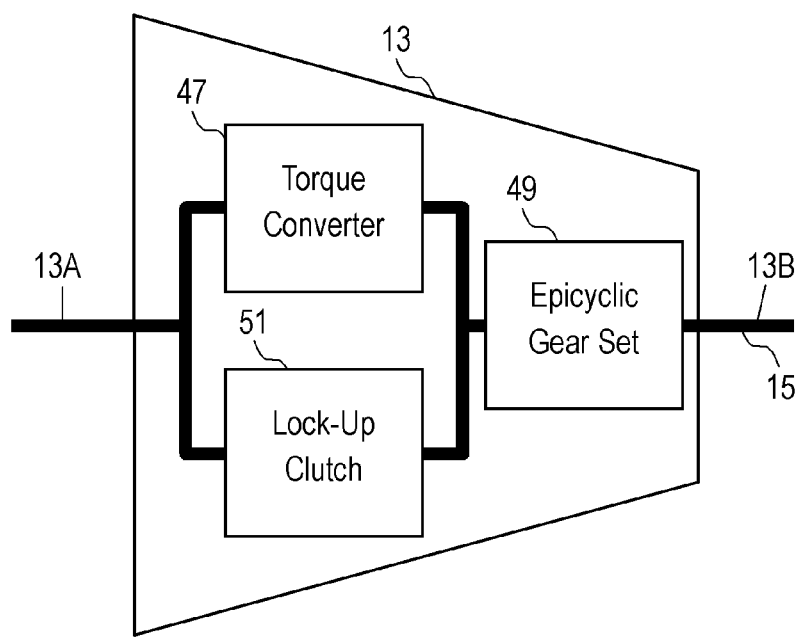
FIG. 4 is a schematic view of a transmission of the vehicle hybrid system according to Embodiment 1.

FIG. 4 is a schematic view of transmission 13. According to Embodiment 1, transmission 13 is an automatic transmission which includes torque converter 47 associated with lock-up clutch 51. As shown in FIG. 4, an input from engine 11 to input side 13A is input to torque converter 47. Then, the input is input to epicyclic gear set 49 in the post stage via torque converter 47. In this configuration, the input from engine 11 is output from output side 13B to drive shaft 15 having a rotation speed changed from that of the input. In the case that vehicle 501A in high gears is traveling at middle or high speeds, controller 23 controls the transmission such that lock-up clutch 51 is engaged in order to reduce a loss in torque converter 47. In this configuration, the loss in torque converter 47 can be avoided even with conventional configurations; unfortunately, such avoidance is available only within a specific region. The transmission gear ratio at each transmission stage of transmission 13 is shown in Table 1.

TABLE 1

| Transmission Stage | Input:Output |
|---|---|
| 1st Speed | 4:1 |
| 2nd Speed | 2:1 |
| 3rd Speed | 1.5:1 |
| 4th Speed | 1:1 |
| 5th Speed | 0.8:1 |

One-way clutch 17 can rotate only in the direction in which the rotation of motor generator 19 is transmitted to engine 11, and cannot rotate in the direction in which the rotation of engine 11 is transmitted to motor generator 19. That is, as shown in FIG. 2, when a rotation speed RE at point E (end 17B coupled with motor generator 19) is not smaller than a rotation speed RA at point A (end 17A coupled with engine 11), one-way clutch 17 is engaged to couple between ends 17A and 17B. When the rotation speed RE at point E is smaller than the rotation speed RA at point A, ends 17A and 17B are disconnected from each other to cause one-way clutch 17 to race.

On the other hand, clutch 21 is configured such that an external signal can control the connection and disconnection between ends 21A and 21B. According to Embodiment 1, clutch 21 is controlled by controller 23.

An operation of vehicle hybrid system 501 according to Embodiment 1 will be described below. FIGS. 5 to 7A are schematic views of vehicle hybrid system 501 for illustrating the operations thereof.

An operation of the system during starting of engine 11, acceleration, and traveling at a constant speed will be first described. FIG. 7B shows the statuses of parts during the starting of engine 11, acceleration, and traveling at a constant speed.

During stopping of vehicle 501A, the speed of the vehicle is 0 (zero) km/h and engine 11 stops. The rotation speed at points from point A to point E shown in FIG. 2 is 0 (zero) rpm, as shown in FIG. 7B. Hence, both the number RA of revolution at point A and the number RE of revolution at point E are equal to each other, 0 (zero) rpm. Therefore, one-way clutch 17 can be engaged immediately. In this case, since no part rotates, controller 23 disengages both lock-up clutch 51 and clutch 21.

When a driver presses down an acceleration pedal to generate a signal of an acceleration command, controller 23 receives the signal. Upon receiving the signal, controller 23 first drives motor generator 19 to rotate engine 11 to start since one-way clutch 17 is engaged. Simultaneously to this, point A rotates as well, so that the driving force is transmitted to drive shaft 15, thereby eventually driving tires 29 to cause vehicle 501A to start moving at a low speed.

In this case, engine 11, upon being a 3-liter class V-6 engine, for example, requires a torque for starting engine 11 is about 100 N·m. On the other hand, the maximum torque of motor generator 19 is 25 N·m as shown in FIG. 3. Based on the gear ratio of gear 35 to gear 37, the torque of motor generator 19 is multiplied by five to rotate engine 11. A starting torque of 125 N·m is applied to engine 11. Vehicle hybrid system 501 according to Embodiment 1 can thus start engine 11 sufficiently.

This operation can be summarized as that, when starting engine 11, controller 23 drives motor generator 19 while clutch 21 is disengaged.

Figure 5:
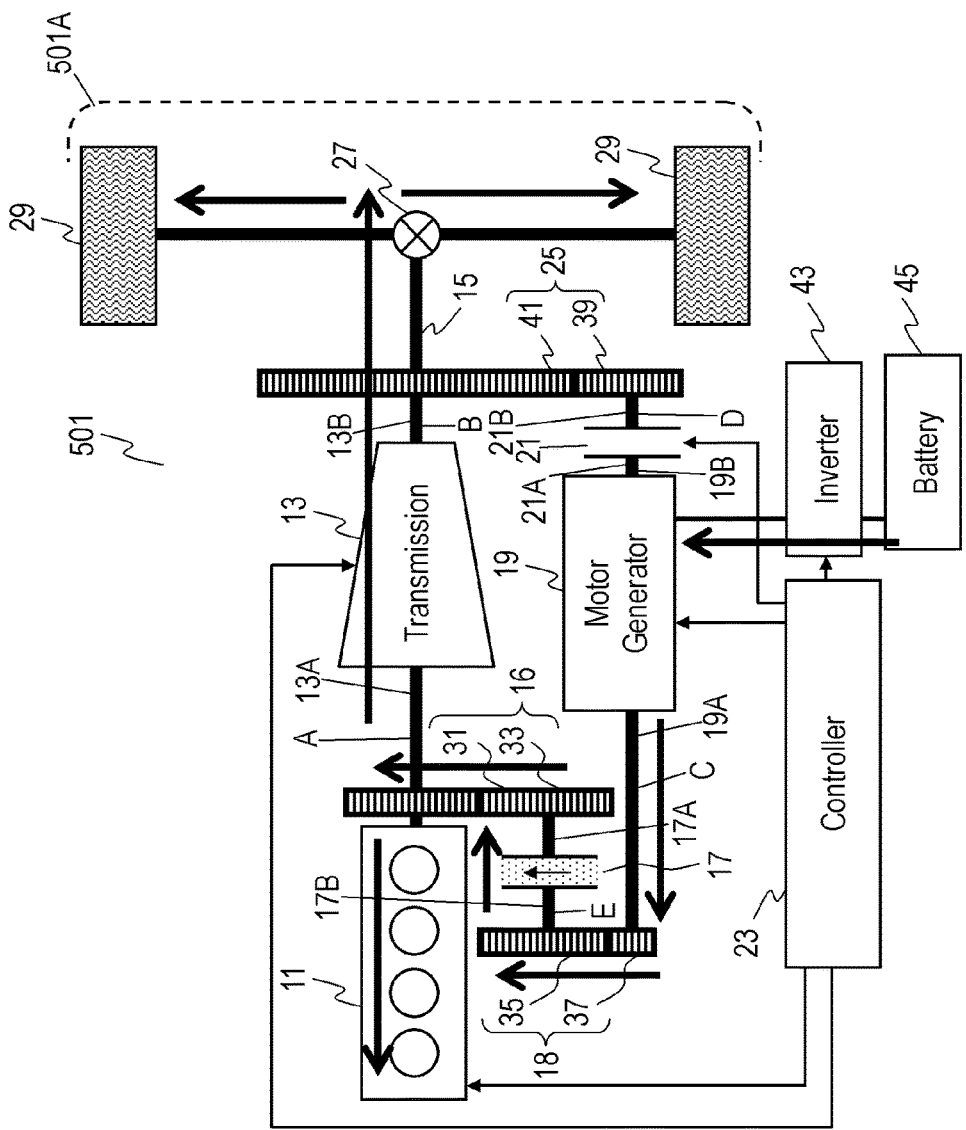
FIG. 5 is a schematic view of the vehicle hybrid system according to Embodiment 1 for illustrating an operation at the starting of an engine.

Controller 23 starts engine 11 as follows. First, the rotation speed of engine 11 increases. In the case that engine 11 is a direct-injection engine, for example, when either the first or the second cylinder of the engine reaches the compression top dead center, fuel is directly injected into the cylinder. Immediately after the injection, the mixture of air and the injected fuel is combusted with a spark plug, thereby starting engine 11. After that, a mode in which vehicle 501A is traveled with motor generator 19 is shifted to a mode in which vehicle 501A is traveled with engine 11. The situation of this operation is shown in FIG. 5. Since clutch 21 is disengaged, the driving force generated by motor generator 19 is not only transmitted to engine 11, but also simultaneously input to transmission 13 to drive tires 29 as well, as indicated by thick arrows shown in FIG. 5. The rotation speed of each part in this situation is shown in FIG. 7B.

Engine 11 is thus started by the driving force generated by motor generator 19, similarly to a push start, for the speed of the vehicle ranging from 0 (zero) to 2 km/h. At this moment, the rotation speed RC at point C motor generator 19 ranges from 0 (zero) to 3000 rpm in which the motor generator can generate the maximum torque enough to start engine 11.

For example, when the speed of the vehicle is 2 km/h, the rotation speed RB (point B) of drive shaft 15 is uniquely determined to be 50 rpm based on a fixed reduction gear ratio of differential gear 27.

At this moment, the status of gears of transmission 13 is at the first speed for starting, and the transmission gear ratio is 4:1 according to Table 1. The rotation speed RA (point A) of engine 11 would intrinsically be 200 rpm that is four times the rotation speed RB (point B). However, torque converter 47 rotates while slipping since lock-up clutch 51 inside transmission 13 is disengaged. In FIG. 7B, the slip ratio in this case is 3.0; therefore, the net result is that the rotation speed RA (point A) of engine 11 is 600 rpm.

At this moment, motor generator 19 applies the torque to transmission 13 via rotation-transmitting part 18, one-way clutch 17, and rotation-transmitting part 16, thereby driving tires 29 via drive shaft 15 and differential gear 27, which assists the running of vehicle 501A. In this configuration, the rotation speed RC (point C) of motor generator 19 is 3000 rpm based on the gear ratio of 5:1 of rotation-transmitting part 18.

On the other hand, based on the rotation speed RB at point B and the gear ratio, the rotation speed RD at point D is 150 rpm which is driven by drive shaft 15 via rotation-transmitting part 25. Rotation speed RD is smaller than the rotation speed RC (point C) of 3000 rpm of motor generator 19, but does not cause any inconsistency between rotation speeds RD and RC since clutch 21 is disengaged at this moment.

The rotation speed of every part can thus be determined. The following description will focus on only parts necessary for the explanation. Then, detailed descriptions of every item shown in FIG. 7B are omitted.

The operation described above causes engine 11 to start while the speed of the vehicle ranges from 0 (zero) to about 2 km/h. Then, the mode of traveling is shifted to the traveling driven by engine 11. After that, controller 23 causes motor generator 19 to reduce the rotation speed of the motor generator. Then, clutch 21 is engaged to apply the output of motor generator 19 to drive shaft 15 via rotation-transmitting part 25, thereby driving tires 29.

That is, in the case that the speed pf the vehicle is, e.g. 4 km/h, the rotation speed RD at point D is determined as shown in FIG. 7B based on the rotation speed RB (point B) of drive shaft 15.

Figure 6:
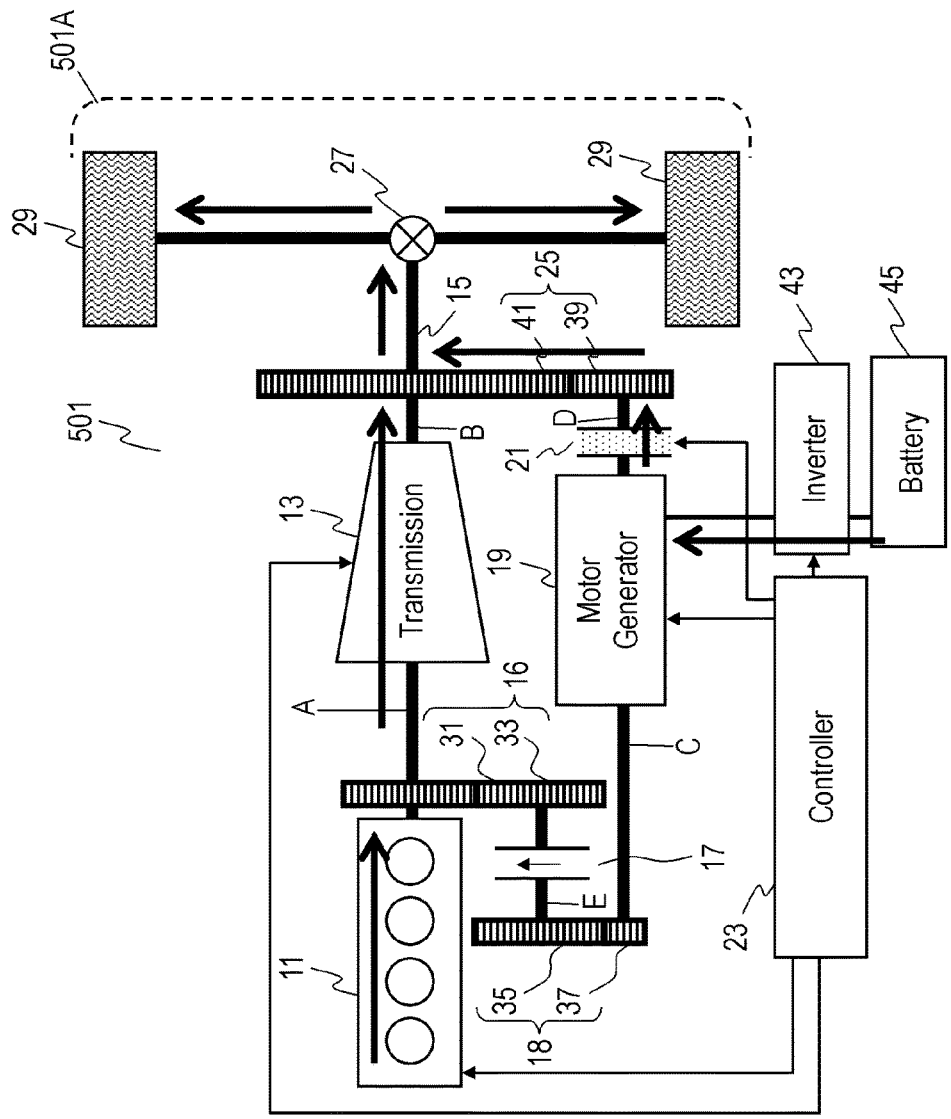
FIG. 6 is a schematic view of the vehicle hybrid system according to Embodiment 1 for illustrating an operation for assisting a power running.
Figure 7A:
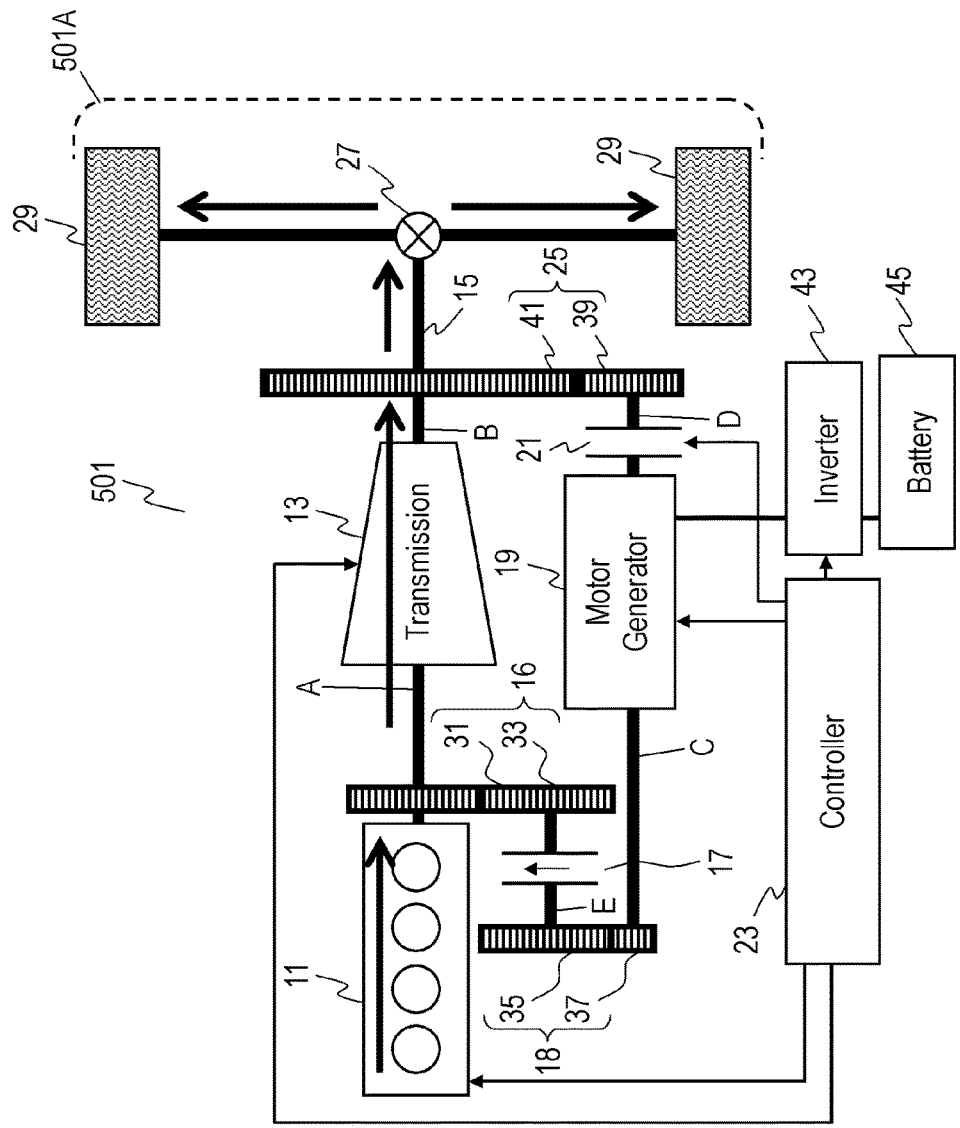
FIG. 7A is a schematic view of the vehicle hybrid system according to Embodiment 1 for illustrating an operation during not assisting.

As shown in FIG. 6, clutch 21 is engaged. The rotation speed RD at point D is equal to the rotation speed RC (point C) of motor generator 19.

Since the transmission stage of transmission 13 is still the first speed, the rotation speed RA at point A would intrinsically be 400 rpm. However, lock-up clutch 51 is still disengaged, and allows the torque converter to slip at a slip ratio of 2.0. Therefore, the net result is that the rotation speed RA (point A) of engine 11 is 800 rpm.

At the speed of 4 km/h, the rotation speed RE (60 rpm) at point E is smaller than the rotation speed RA (800 rpm) at point A. Therefore, one-way clutch 17 is disengaged. Consequently, engine 11 applies the driving force to drive shaft 15 via transmission 13 on the one hand, while motor generator 19 applies the driving force to the drive shaft via rotation-transmitting part 25 on the other hand.

As shown in FIG. 3, motor generator 19 can generate a torque up to the maximum torque of 25 N·m at the rotation speed of 300 rpm. The torque is multiplied by three by rotation-transmitting part 25, and is transmitted to drive shaft 15.

As the speed of the vehicle increases, the transmission stage of transmission 13 is shifted from the first speed up to the fifth speed. While the gear is shifted up, controller 23 controls lock-up clutch 51 such that lock-up clutch 51 is engaged at middle-to-high speeds to eliminate the slipping between engine 11 and transmission 13, thereby increasing efficiency. At low speeds, on the other hand, controller 23 disengages lock-up clutch 51 and utilizes a shock dampening function of torque converter 47 to reduce, e.g. gear-shift shocks and micro-vibrations attributed to torsional vibrations of the drive-train.

An operation of vehicle hybrid system 501 at each speed of vehicle 501A will be described below.

At a speed ranging from 4 km/h to 40 km/h, none of statuses of one-way clutch 17 and clutch 21 change. Accordingly, as shown in FIG. 6, motor generator 19 performs power running to assist drive shaft 15. However, depending on the speed of the vehicle, torque converter 47 changes both the transmission stage and the rotation-speed reduction ratio due to slipping, which results in the rotation speed of each part, as shown in FIG. 7B.

When the speed of the vehicle reaches 60 km/h, the transmission stage of transmission 13 is shifted to the fourth speed and lock-up clutch 51 is engaged, resulting in no slipping in torque converter 47. Accordingly, since the gear ratio of transmission 13 becomes 1:1, the rotation speed RA (point A) of engine 11 is equal to the rotation speed RB (point B) of drive shaft 15 which is 1500 rpm according to Embodiment 1.

In this case, based on the gear ratio described above of rotation-transmitting part 25, the rotation speed RD at point D is 4500 rpm. Therefore, as shown in FIG. 3, the higher the speed of the vehicle increases, the smaller the torque transmitted to drive shaft 15 is.

According to Embodiment 1, the amount of energy regenerated as described later decreases from the amount of physical kinetic energy of vehicle 501A, which is attributed to total mechanical-electrical transmission efficiency. During power running, the running energy also decreases due to the total mechanical-electrical transmission efficiency. That is, the amount of mechanical energy output from the tires is smaller than the amount of electrical energy stored in the battery. Therefore, from a viewpoint of energy balance between the regeneration and the power running, controller 23 determines that the upper limit of the speed of the vehicle is lower in the power running than in the regeneration.

For this reason, controller 23 disengages clutch 21 to halt the power running of motor generator 19. At this moment, the driving force is transmitted from engine 11 via transmission 13 and drive shaft 15 to tires 29, as denoted by thick arrows shown in FIG. 7A.

In the case that the speed of the vehicle is 60 km/h, although the torque is low, the assistance of drive shaft 15 is nevertheless possible. Therefore, even at the speed of 60 km/h, controller 23 may continuously cause motor generator 19 to assist drive shaft 15 at, e.g. hard acceleration.

At a speed of the vehicle of 100 km/h, the transmission stage of transmission 13 is shifted to the fifth speed, and the transmission gear ratio is 0.8:1 (overdrive gear ratio) according to Table 1. Accordingly, although the rotation speed of engine 11 is 2000 rpm, the rotation speed of drive shaft 15 is 2500 rpm. At this moment, if clutch 21 is engaged, based on the gear ratio of 3 (three) of rotation-transmitting part 25, the rotation speed RD at point D is 7500 rpm. This rotation speed exceeds the upper limit (6000 rpm) of the rotation speed of motor generator 19, which causes the counter electromotive voltage to exceed the battery voltage, resulting in an overvoltage applied to battery 45. Therefore, in vehicle hybrid system 501 according to Embodiment 1, controller 23 performs the following control. When the speed of the vehicle exceeds a predetermined vehicle speed (80 km/h according to Embodiment 1) at which the counter electromotive voltage exceeds a predetermined value, the controller disengages clutch 21 and causes motor generator 19 to halt the power running. On the other hand, when the speed of the vehicle is not higher than the predetermined speed, the controller engages clutch 21 and causes motor generator 19 to perform the power running.

However, the predetermined speed of the vehicle described above is not necessarily the speed of the vehicle at which the counter electromotive voltage exceeds the battery voltage. The predetermined speed may be appropriately determined in accordance with the state of control of clutch 21 and/or motor generator 19, based on a parameter, such as efficiency reduction parameter depending on the rotation speed, with the parameter obtained via field-weakening control.

Vehicle 501A is thus accelerated. In addition, during traveling at a constant speed after the acceleration, controller 23 controls vehicle hybrid system 501 based on the statuses shown in FIG. 7B in accordance with the speed of the vehicle.

The operations described above can be summarized as that, in case that vehicle 501A accelerates or travels at a constant speed, controller 23 engages clutch 21 and drives motor generator 19 while the speed of the vehicle rises from 0 (zero) to a predetermined speed, whereas the controller disengages clutch 21 and halts motor generator 19 from operating when the speed of the vehicle exceeds the predetermined speed.

Figure 8A:
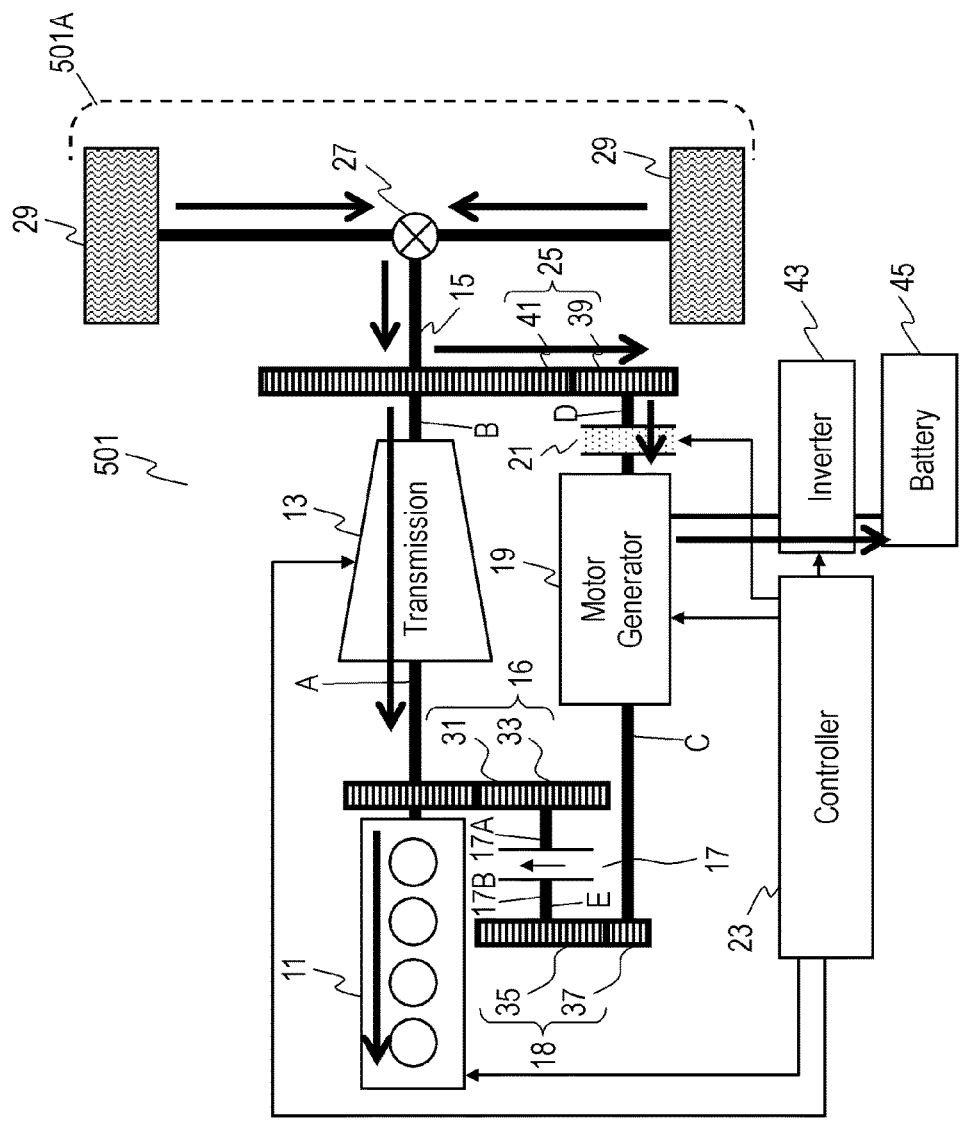
FIG. 8A is a schematic view of the vehicle hybrid system according to Embodiment 1 for illustrating an operation during regeneration.

An operation of vehicle hybrid system 501 during deceleration of vehicle 501A will be described below. FIG. 8A is a schematic view of vehicle hybrid system 501 for illustrating the operation of vehicle hybrid system 501 during the deceleration. FIG. 8B shows the statuses of parts of vehicle hybrid system 501 during the deceleration of vehicle 501A.

When the speed of the vehicle is 100 km/h, the status of vehicle hybrid system 501 is identical to that shown in FIG. 7B. When vehicle 501A is decelerated from the speed of 100 km/h and reaches 80 km/h, the rotation speed RC (point C) of motor generator 19 reaches 6000 rpm, as shown in FIG. 7B, so that the rotation speed RC is not larger than the upper limit of the rotation speed of motor generator 19. This operation allows motor generator 19 to generate regenerative electric power; therefore, controller 23 engages clutch 21. This causes motor generator 19 to rotate due to a rotation of drive shaft 15. At this moment, the rotation speed of engine 11 is 1600 rpm according to FIG. 8B. On the other hand, the rotation speed (6000 rpm) of motor generator 19 is divided by 5 (five) due to rotation-transmitting part 18; therefore, the rotation speed RE at point E of end 17A of one-way clutch 17 is 1200 rpm. The rotation speed RE is smaller than the rotation speed of engine 11, so that one-way clutch 17 is disengaged and transmits no torque. During the deceleration, engine 11 is not required to output any driving force, so that the engine may be usually subjected to fuel cut-off for improving fuel efficiency. This operation allows vehicle 501A to travels in an inertial traveling state, i.e. so-called coasting.

A flow of the driving force in this case is denoted by thick arrows shown in FIG. 8A. The rotation force of drive shaft 15 which is rotated via tires 29 is input to motor generator 19 via both rotation-transmitting part 25 and clutch 21 allows motor generator 19 to generate regenerative electric power. This regenerative electric power is stored in battery 45 via inverter 43. Drive shaft 15 is also coupled with transmission 13. As shown in FIG. 8B, at a speed of the vehicle of 80 km/h, the transmission stage is the fifth speed and lock-up clutch 51 is engaged; therefore, the rotation input to transmission 13 is also transmitted to engine 11. However, engine 11 is subjected to the fuel cut-off as described above, so that the engine is merely rotated by drive shaft 15.

After that, when the speed of the vehicle decreases to 60 km/h, the basic operations are identical to those at the speed of 80 km/h as described above except that the transmission stage is shifted down to the fourth speed.

When the speed of the vehicle reaches 40 km/h, the transmission stage is shifted down to the third speed and lock-up clutch 51 is disengaged as countermeasures for torsional resonance of the drive-train, which causes slipping in torque converter 47. Therefore, in the case that the rotation speed RB (point B) of drive shaft 15 is 1000 rpm, then the rotation speed RA (point A) of engine 11 is a maximum of 1500 rpm since the transmission gear ratio of drive shaft 15 is 1.5. The net result of the rotation speed RA (point A) of engine 11 becomes smaller than the maximum due to the slipping. As shown in FIG. 8B, at a speed of the vehicle of 40 km/h, clutch 21 is engaged and motor generator 19 continuously generate the regenerative electric power. This causes the rotation speed RE at point E to be 600 rpm that is one-fifth the rotation speed RC (point C; 3000 rpm) of motor generator 19. Therefore, even if the rotation speed RA at point A is reduced to be smaller than the maximum of 1500 rpm, one-way clutch 17 is automatically engaged when the rotation speed RA becomes equal to the rotation speed RE (600 rpm) at point E. Consequently, engine 11 can continuously rotate even with the occurrence of the slipping.

In a usual vehicle, when the lock-up clutch of a torque converter is disengaged, an engine cannot rotate by its own in the case that, for example, the vehicle starts traveling on an upward slope, which may cause an engine stall. For this reason, fuel injection is usually resumed whenever the lock-up clutch is disengaged.

In contrast, in vehicle hybrid system 501 according to Embodiment 1, the rotation of drive shaft 15 is input to motor generator 19 via rotation-transmitting part 25 and clutch 21, and is also transmitted to one-way clutch 17 via rotation-transmitting part 18. Accordingly, engine 11 continuously rotates without a halt until vehicle 501A stops if clutch 21 is engaged, which allows the continuous fuel cut-off. This improves fuel efficiency. In addition, in the case that vehicle 501A adopts a break system which uses an intake-air negative pressure of engine 11 for a booster, this configuration allows vehicle 501A to hold the negative pressure, enhancing safety of vehicle 501A.

After that, although the transmission stage is shifted down as the speed of the vehicle decreases to 20 km/h and then to 10 km/h, basic operations of vehicle hybrid system 501 are identical to those at a speed of the vehicle of 40 km/h as described above.

Next, when the speed of the vehicle decreases to 4 km/h, the kinetic energy of vehicle 501A becomes so small that almost no regenerative electric power can be obtained. Hence, controller 23 shifts transmission 13 to neutral and disengages clutch 21, thereby causing motor generator 19 to halt the generation of the regenerative electric power. This state is the same as that shown in FIG. 2. As a result, both the rotation speed RA at point A and the rotation speed RE at point E are equal to each other, 0 (zero) rpm; therefore, one-way clutch 17 can be engaged immediately. However, drive shaft 15 still rotates, so that the rotation speeds RB and RD at points B and D are not 0 (zero) rpm.

After that, even when the speed of the vehicle decreases to 2 km/h, controller 23 still continuously allows the speed of the vehicle to be 4 km/h, which brings the speed of the vehicle to be 0 (zero) km/h, with rotation speeds of all the points A to E being 0 (zero) rpm, i.e. a halt.

The operations described above can be summarized as follows. In cases that vehicle 501A is decelerated, controller 23 engages clutch 21 and causes motor generator 19 to generate the regenerative electric power when the rotation speed of motor generator 19 is not larger than the upper limit of the rotation speed thereof, whereas the controller disengages clutch 21 and halts motor generator 19 from operating when the speed of vehicle 501A reaches the lower limit of the speed of the vehicle.

As shown in FIG. 8A, when the speed of the vehicle is 80 km/h, engine 11 is rotated via tires 29. At this moment, a loss occurs in engine 11, which shortens a distance that can be traveled due to a coasting during the fuel cut-off. Accordingly, in order to increase the distance can-be-traveled due to the coasting, controller 23 may shift transmission 13 to neutral to reduce the loss in engine 11. Moreover, controller 23 may additionally disengage clutch 21 as well, thereby halting motor generator 19 from generating the regenerative electric power, resulting in a further longer distance can be traveled due to the coasting.

This control causes the rotation speed RA (point A) of engine 11 to be 0 (zero) rpm. Hence, when engine 11 is restarted by pressing down the acceleration pedal, motor generator 19 rotates. This operation, since the rotation speed RA at point A is 0 (zero) rpm, one-way clutch 17 is engaged. This allows motor generator 19 to drive engine 11, thereby immediately restarting the engine.

On the other hand, when the vehicle is coasting at low speeds of about 40 km/h, controller 23 may shift transmission 13 to neutral, engage clutch 21, and extract no regenerative electric power generated by motor generator 19. As a result, engine 11 is rotated by drive shaft 15 via motor generator 19 that is disposed in parallel with transmission 13. At this moment, the rotation speed of the engine is smaller when the engine is driven via the motor generator than when the engine is driven via transmission 13, thereby reducing a loss in engine 11. This operation increases the distance which vehicle 501A can travel due to coasting. During the traveling of vehicle 501A, engine 11 is continuously rotated by drive shaft 15 via motor generator 19. Therefore, in the case that engine 11 is restarted by pressing down the acceleration pedal, the vehicle can immediately shift to the mode of traveling by engine 11, only by carrying out fuel injection and ignition. It is also possible to avoid a loss of the negative pressure in the break system which uses a negative air-pressure booster, enhancing safety.

Moreover, when vehicle 501A travels reversely, controller 23 disengages clutch 21 to cut off motor generator 19. Then, similarly to usual vehicles, the reverse gear of transmission 13 is selected, thereby causing vehicle 501A to travel reversely by engine 11. Alternatively, controller 23 may shift transmission 13 to neutral and cause motor generator 19 to rotate reversely, thereby causing vehicle 501A to travel reversely. In this case, one-way clutch 17 rotates at idle because of the reverse rotation of motor generator 19. Moreover, motor generator 19 for reverse traveling allows an effective use of the regenerative energy.

The operations described above of vehicle hybrid system 501 according to Embodiment 1 are summarized as follows.

When engine 11 is started, controller 23 disengages power connecting-disconnecting part 20 and then causes motor generator 19 to perform power running, thereby starting engine 11 via directional power transmission part 22. Simultaneously to this, the controller also drives transmission 13 to rotate drive shaft 15.

In addition, controller 23 engages power connecting-disconnecting part 20 and then causes motor generator 19 to perform power running, thereby rotating drive shaft 15 via power connecting-disconnecting part 20 to drive vehicle 501A.

Moreover, when vehicle 501A is decelerated, controller 23 engages power connecting-disconnecting part 20 and then causes motor generator 19 to generate regenerative electric power.

In the configuration and operations described above, transmission 13 and motor generator 19 are mechanically disposed in parallel with each other. Then, clutch 21 on output side 13B of transmission 13 is engaged in accordance with the conditions of the power running and regeneration, as described above. The engaging of the clutch allows the power running and regeneration stresses of motor generator 19 to be transmitted directly drive shaft 15. Therefore, this operation eliminates a loss in transmission 13, providing vehicle hybrid system 501 with high efficiency.

Exemplary Embodiment 2

Figure 9:
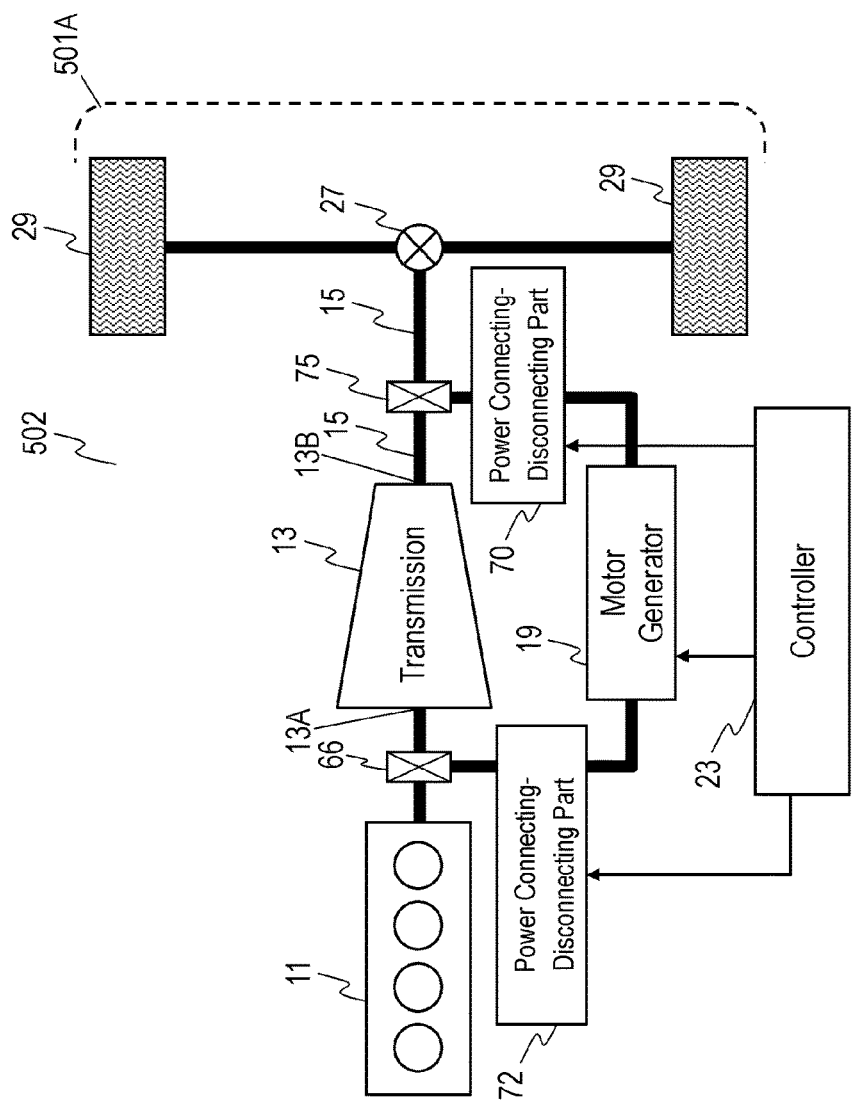
FIG. 9 is a schematic view of a vehicle hybrid system according to Exemplary Embodiment 2.
Figure 10:
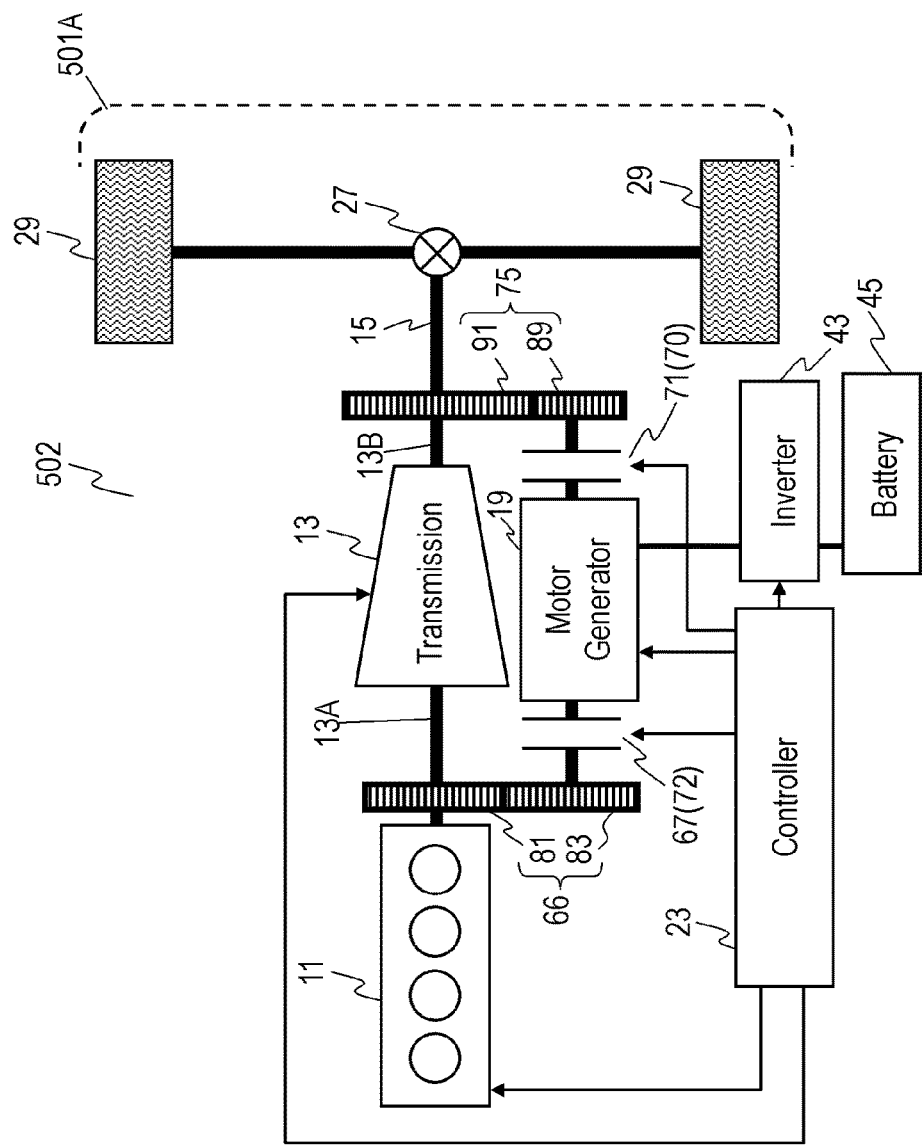
FIG. 10 is a schematic view of the vehicle hybrid system according to Embodiment 2.

FIGS. 9 and 10 are schematic views of vehicle hybrid system 502 according to Exemplary Embodiment 2. In FIGS. 9 and 10, components identical to those of vehicle hybrid system 501 shown in FIGS. 1 and 2 according to Embodiment 1 are designated by the same reference numerals.

As shown in FIG. 9, vehicle hybrid system 502 includes engine 11 installed to vehicle 501A, transmission 13 mechanically coupled with engine 11, drive shaft 15 mechanically coupled with transmission 13, motor generator 19 mechanically coupled with drive shaft 15 via both transmission-output-side rotation-transmitting part 75 and power connecting-disconnecting part 70, power connecting-disconnecting part 72 mechanically coupled with motor generator 19, transmission-input-side rotation-transmitting part 66 mechanically coupling between power connecting-disconnecting part 72 and engine 11, and controller 23 electrically coupled with power connecting-disconnecting part 70, motor generator 19, and power connecting-disconnecting part 72.

In the vehicle hybrid system, transmission 13 and motor generator 19 are disposed in parallel with each other with respect to both drive shaft 15 and the output of engine 11. This configuration allows controller 23 to control power connecting-disconnecting part 70, power connecting-disconnecting part 72, and motor generator 19 in power running and regeneration. Such control allows motor generator 19 to be directly coupled with drive shaft 15 while engine 11 can started. This configuration allows the highly efficient regeneration and power running while a loss in transmission 13 is avoided, hence providing high fuel efficiency.

The configuration and operations of vehicle hybrid system 502 according to Embodiment 2 will be detailed below.

As shown in FIG. 10, vehicle hybrid system 502 according to Embodiment 2 includes power connecting-disconnecting part 72 (clutch 67) instead of directional power transmission part 22 (one-way clutch 17) of vehicle hybrid system 501 according to Embodiment 1. Clutch 67 can be engaged and disengaged under control from the outside. On the other hand, the configuration of clutch 71 is identical to that of clutch 21. Controller 23 can engage and disengage clutches 67 and 71 independently of each other.

At least one of power connecting-disconnecting part 70 (clutch 71) and power connecting-disconnecting part 72 (clutch 67) may be an electrically-controlled two-way clutch. In this case, an external signal can select, e.g. operation modes concerning an idle rotation and a direction of rotation. Therefore, various controls of vehicle hybrid systems 502 according to Embodiment 2, which will be described later, can be easily performed with a simple configuration.

Because of the absence of one-way clutch 17, vehicle hybrid system 502 according to Embodiment 2 does not include rotation-transmitting part 18 of vehicle hybrid system 501 according to Embodiment 1. Vehicle hybrid system 501 according to Embodiment 1 includes rotation-transmitting part 18 for reducing the rotation speed since one-way clutch 17 can hardly follow high rotational speeds.

The configuration of vehicle hybrid system 502 is identical to that of vehicle hybrid system 501 according to Embodiment 1 with the above exceptions. Vehicle hybrid system 502 according to Embodiment 2 includes transmission-input-side rotation-transmitting part 66 including gears 81 and 83, instead of rotation-transmitting part 16 including gears 31 and 33 of vehicle hybrid system 501 according to Embodiment 1. Configurations of gears 81 and 83 are similar to those of gears 31 and 33, respectively. Vehicle hybrid system 502 according to Embodiment 2 includes transmission-output-side rotation-transmitting part 75 including gears 89 and 91, instead of rotation-transmitting part 25 including gears 39 and 41 of vehicle hybrid system 501 according to Embodiment 1. Configurations of gears 89 and 91 are similar to those of gears 39 and 41, respectively. These parts constitute a transmission part with a function of changing the rotation speed. One of rotation-transmitting parts 25 and 75 may constitute the transmission part while the other may constitute a part without a function of changing the rotation speed. That is, the transmission part is disposed in at least one of two coupling paths, that is, a path from engine 11 via power connecting-disconnecting part 70 to motor generator 19, and a path from motor generator 19 via power connecting-disconnecting part 72 to drive shaft 15. The transmission part may be configured appropriately in accordance with rotation characteristics of motor generator 19, engine 11, and transmission 13. A configuration without any transmission part is also possible depending on the rotation characteristics of motor generator 19, engine 11, and transmission 13. In practical cases, however, the configuration preferably includes the transmission part in order to match their characteristics different with each other.

An operation of vehicle hybrid system 502 will be described below. First, basic operations of vehicle hybrid system 502 according to Embodiment 1 are identical to those according to Embodiment 1 since the configuration of the former system is identical to that of the latter system except that clutch 67 is disposed in the former instead of one-way clutch 17 disposed in the latter. Controller 23 engages and disengages clutch 67 similarly to one-way clutch 17 of vehicle hybrid system 501 according to Embodiment 1.

Basic operations of vehicle hybrid system 502 will be described below.

When engine 11 is started, controller 23 disengages power connecting-disconnecting part 70 and engages power connecting-disconnecting part 72. Then, the controller causes motor generator 19 to perform power running, which causes engine 11 to start via power connecting-disconnecting part 72. Simultaneously, motor generator 19 also drives transmission 13 to rotate drive shaft 15.

Controller 23 engages power connecting-disconnecting part 70, disengages power connecting-disconnecting part 72, and then, causes motor generator 19 to perform power running. This operation allows motor generator 19 to rotate drive shaft 15 via power connecting-disconnecting part 70, thereby driving vehicle 501A.

When vehicle 501A is decelerated, controller 23 engages power connecting-disconnecting part 70, disengages power connecting-disconnecting part 72, and then, causes motor generator 19 to generate regenerative electric power.

Vehicle hybrid system 502 thus performs the basic operations identical to those of vehicle hybrid system 501 according to Embodiment 1, which allows motor generator 19 to perform all the operations in starting of the engine, power running, and regeneration. This improves efficiency similarly to vehicle hybrid system 501 according to Embodiment 1.

The operations of vehicle hybrid system 502 according to Embodiment 2 will be detained below.

Figure 11:
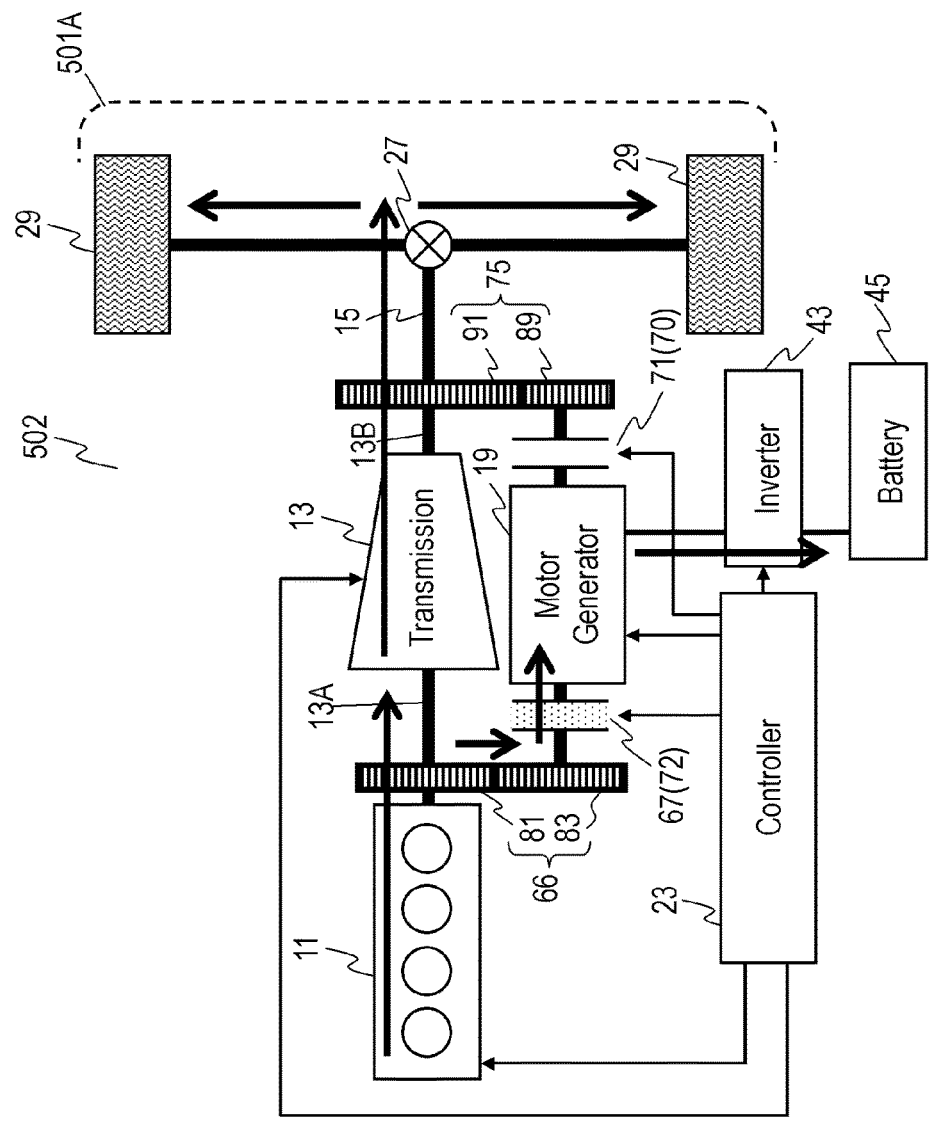
FIG. 11 is a schematic view of the vehicle hybrid system according to Embodiment 2 for illustrating an operation during the shifting of an operation point.

An operation of vehicle hybrid system 502 shifting an operating point will be first described below. FIG. 11 is a schematic view of vehicle hybrid system 502 for illustrating the operation of shifting the operation point. When vehicle 501A is driven by engine 11 via transmission 13, controller 23 engages clutch 67 and disengages clutch 71, thereby allowing motor generator 19 to generate electricity such that the rotation speed and the torque of engine 11 provides high efficiency of engine 11. At this moment, controller 23 sends engine 11 an output command for the engine to output power additionally includes extra power accordingly necessary to the generation of electricity by motor generator 19. As a result, engine 11 outputs the torque which is the sum of a torque due to the running resistance and an additional torque necessary for the generation of electricity by motor generator 19. Accordingly, an operating point is shifted such that a load operating point shifts to higher loads. Consequently, vehicle hybrid system 502 as a whole can improve efficiency. The generated electric power is stored in battery 45 via inverter 43 to be used again as energy for power running.

This operation is not performed in vehicle hybrid system 501 according to Embodiment 1 due to one-way clutch 17. Upon racing, one-way clutch 17 cannot transmit the rotation of engine 11 to motor generator 19.

Figure 12:
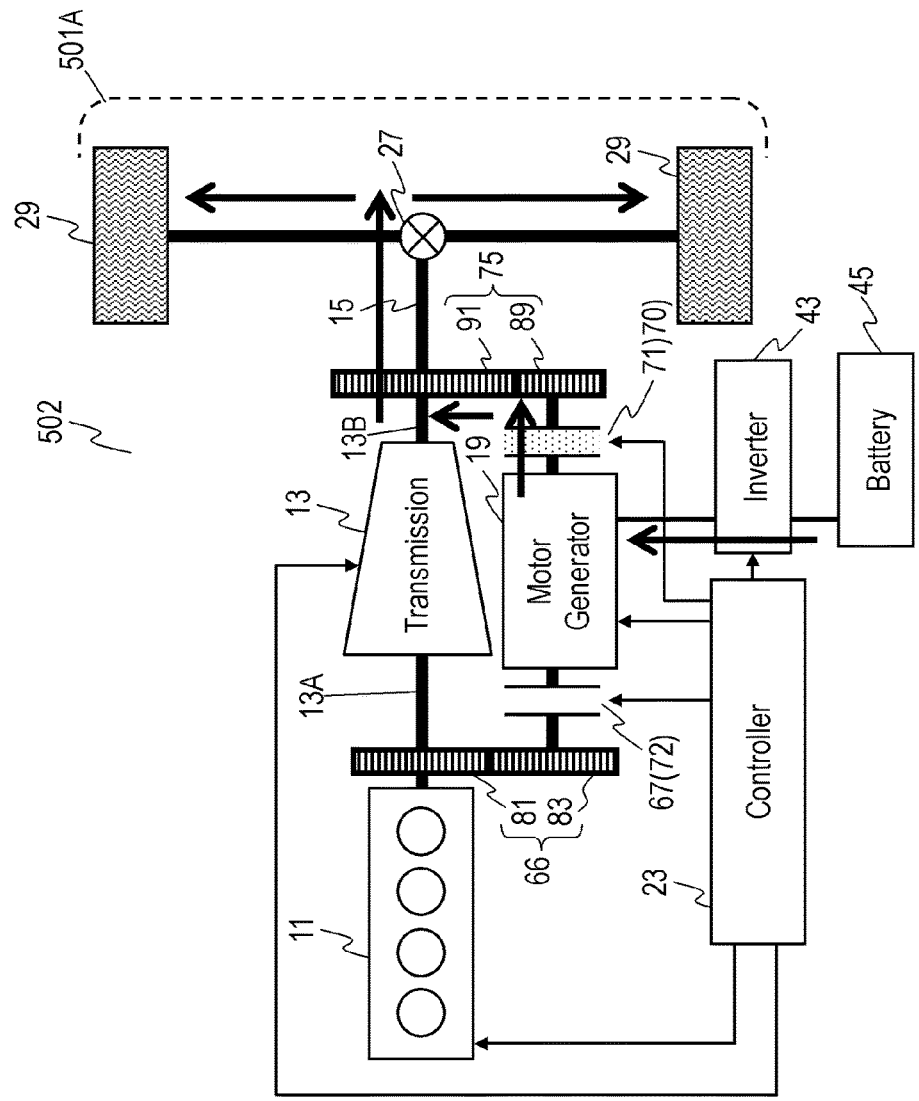
FIG. 12 is a schematic view of the vehicle hybrid system according to Embodiment 2 for illustrating an operation during electric traveling.

An operation of vehicle hybrid system 502 with vehicle 501A traveling by electric power will be described below. FIG. 12 is a schematic view of vehicle hybrid system 502 for illustrating the operation with vehicle 501A traveling by the electric power. Controller 23 disengages clutch 67, engages clutch 71, shifts transmission 13 to neutral, and then, drives motor generator 19, which allows vehicle 501A to travel electrically. When the vehicle travels at low speeds, for example, the vehicle travels only by electricity without starting engine 11, hence reducing fuel consumption in according to this operation. When the vehicle coasts at high speeds, the above control can assist the traveling in coasting. This operation increases a distance that can be traveled by coasting, accordingly reducing fuel consumption.

When vehicle hybrid system 501 according to Embodiment 1 preforms the above operation, engine 11 halts, that is, the rotation speed RA at point A is 0 (zero) rpm since engine 11 suspends fuel injection. In this situation, if motor generator 19 is started to operate, a rotation occurs at point E shown in FIG. 2, which causes one-way clutch 17 to be engaged. The engaging causes engine 11 to be rotated, resulting in an additional loss of electric power associated with the rotations. Therefore, the electric traveling is preferably performed with vehicle hybrid system 502 according to Embodiment 2.

Figure 13:
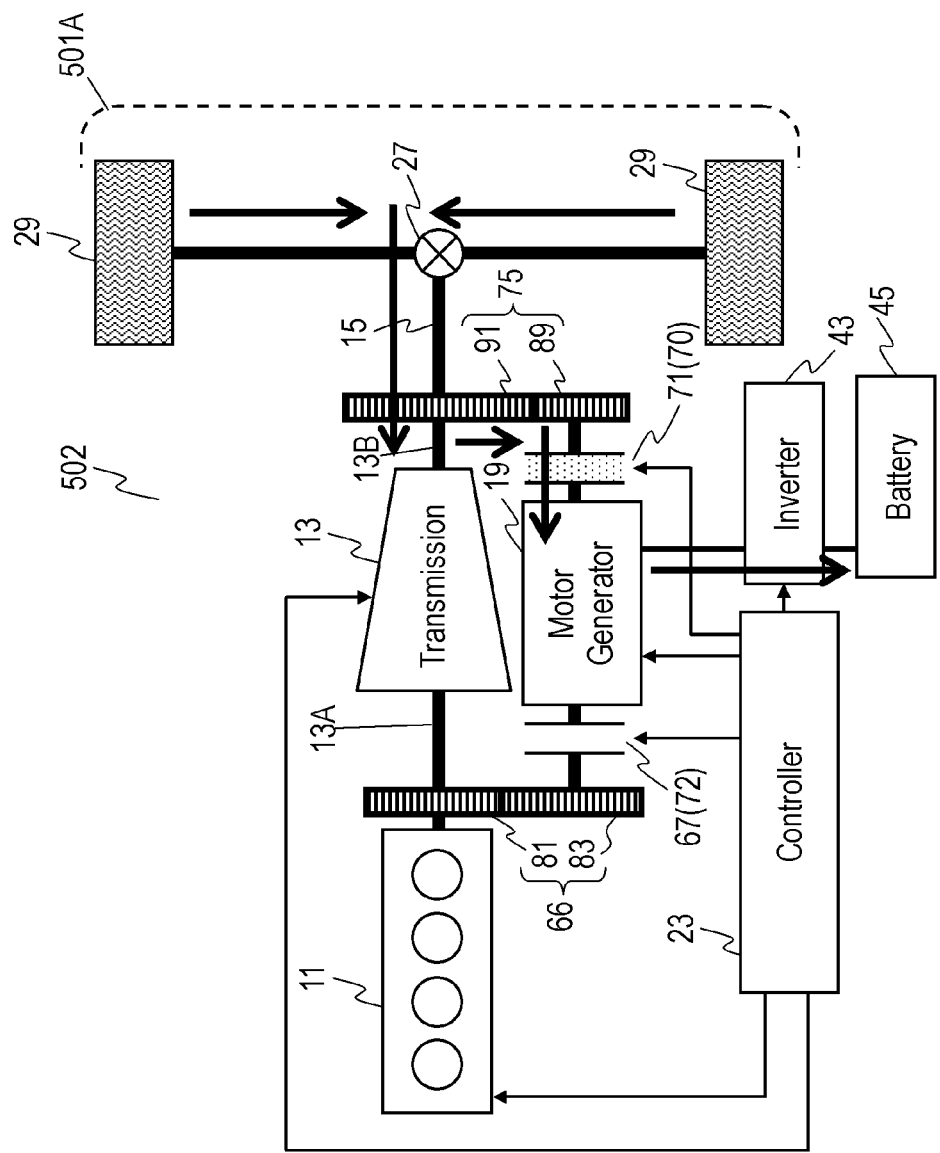
FIG. 13 is a schematic view of the vehicle hybrid system according to Embodiment 2 for illustrating an operation during regeneration.

An operation of highly efficient regeneration of vehicle hybrid system 502 will be described below. FIG. 13 is a schematic view of the vehicle hybrid system according to Embodiment 2 for illustrating the operation during regeneration. In vehicle hybrid system 501 according to Embodiment 1, when the vehicle is decelerated, one-way clutch 17 is engaged during regeneration depending on conditions as shown in the columns of FIG. 8B which involve speeds of the vehicle of 40, 20, and 10 km/h. When one-way clutch 17 is engaged, the rotation of one-way clutch 17 is transmitted to engine 11, resulting in the occurrence of an additional loss according to the rotation of engine 11. In contrast, in vehicle hybrid system 502 according to Embodiment 2, controller 23 can cause all the rotation of tires 29 to be input to motor generator 19 by disengaging clutch 67, engaging clutch 71, and shifting transmission 13 to neutral. As a result, a loss in engine 11 is avoided, resulting in highly efficient regeneration with the avoided loss.

As described above, in vehicle hybrid system 502 according to Embodiment 2, clutch 67 is disengaged and engaged, accordingly leading to complicated control. However, this configuration can eliminate rotation-transmitting part 18 of vehicle hybrid system 501 according to Embodiment 1, resulting in a simple configuration. Vehicle hybrid system 502 according to Embodiment 2 can perform operations for shifting the operation point, electric traveling, and efficient regeneration in addition to operations of vehicle hybrid system 501 according to Embodiment 1, further enhancing efficiency.

In the configuration and operations described above, transmission 13 and motor generator 19 are mechanically disposed in parallel with each other. Clutches 67 and 71 which are coupled with input side 13A and output side 13B of transmission 13 respectively are engaged and disengaged independently in accordance with conditions of power running and regeneration. Such controls allow direct transmission of both power running and regeneration stresses of motor generator 19. As a result, a loss in transmission 13 can be avoided, leading to efficient vehicle hybrid system 502.

All of the speeds of the vehicle and the numerical values in the Tables described in Embodiments 1 and 2 are merely examples, and therefore, may be appropriately modified in accordance with types of engine 11 and motor generator 19.

In vehicle hybrid systems 501 and 502 according to Embodiments 1 and 2, the gears are used for each of the rotation-transmitting parts. Instead of the gears, each of the rotation-transmitting parts may be implemented by pulleys together with a belt or chain while they can slip over time. For this reason, the gears are preferably used from an efficiency point of view.

In vehicle hybrid systems 501 and 502 according to Embodiments 1 and 2, directional power transmission part 22 or power connecting-disconnecting part 72 is mechanically coupled with the coupling part between one end of engine 11 and transmission 13. However, the directional power transmission part or the power connecting-disconnecting part may be coupled with the other end of engine 11. Alternatively, a part may be separately disposed for an exclusive use in taking out the output.

In vehicle hybrid systems 501 and 502 according to Embodiments 1 and 2, motor generator 19 has a double-shaft structure, i.e. a structure with two shafts on both sides which includes shafts 19A and 19B. However, motor generator 19 may have a single-shaft structure. In this case, the end of the single shaft may be equipped with a rotation-transmitting part implemented by, e.g. gears to split the rotation of the shaft. This configuration allows the shingle-shaft structure to be used as well as the double-shaft structure.

INDUSTRIAL APPLICABILITY

A vehicle hybrid system according to the present invention has a configuration in which a motor generator is disposed in parallel with a transmission, hence having high efficiency, and is useful particularly for vehicle hybrid systems each including an engine and a motor generator.

REFERENCE MARKS IN THE DRAWINGS 11 engine
13 transmission
15 drive shaft
17 one-way clutch
18 rotation-transmitting part
19 motor generator
20 power connecting-disconnecting part
21, 67, 71 clutch
22 directional power transmission part
23 controller
25 rotation-transmitting part
66 transmission-input-side rotation-transmitting part
70 power connecting-disconnecting part (first power connecting-disconnecting part)
72 power connecting-disconnecting part (second power connecting-disconnecting part)
75 transmission-output-side rotation-transmitting part
501, 502 vehicle hybrid system
501A vehicle

What is claimed is:
1. A vehicle hybrid system configured to be used in a vehicle having an engine installed thereto, the vehicle hybrid system comprising:
　a transmission mechanically coupled with the engine;
　a drive shaft mechanically coupled with the transmission;
　a rotation-transmitting part coupled with the drive shaft;
　a power connecting-disconnecting part coupled with the drive shaft via the rotation-transmitting part;
　a motor generator mechanically coupled with the power connecting-disconnecting part;
　a directional power transmission part for transmitting power in a direction from the motor generator to the engine to drive the engine and for not transmitting power in a direction from the engine to the motor generator to drive the motor generator; and
　a controller electrically coupled with the motor generator and the power connecting-disconnecting part, wherein
　when the motor generator starts the engine, the controller disengages the power connecting-disconnecting part and the motor generator performs a power running where the motor generator, via the directional power transmission part, drives the transmission to rotate the drive shaft,
　when the motor generator performs the power running during a vehicle running, the controller engages the power connecting-disconnecting part, and the motor generator, via the power connecting-disconnecting part, rotates the drive shaft to drive the vehicle, and when the vehicle is decelerated, the controller engages the power connecting-disconnecting part, and the motor generator performs regeneration until a speed of the vehicle reaches a predetermined lower limit.

2. The vehicle hybrid system according to claim 1, wherein the directional power transmission part comprises a one-way clutch.

3. The vehicle hybrid system according to claim 1, wherein the power connecting-disconnecting part comprises an electrically-controlled two-way clutch.

4. The vehicle hybrid system according to claim 1, further comprising:

a transmission part disposed in at least one of a path from the engine via the directional power transmission part to the motor generator and a path from the motor generator via the power connecting-disconnecting part to the drive shaft.

5. A vehicle hybrid system configured to be used in a vehicle having an engine installed thereto, the vehicle hybrid system comprising:

a transmission mechanically coupled with the engine;

a drive shaft mechanically coupled with the transmission;

a transmission-output-side rotation-transmitting part coupled with the drive shaft;

a first power connecting-disconnecting part mechanically coupled with the drive shaft via the transmission-output-side rotation-transmitting part;

a motor generator mechanically coupled with the first power connecting-disconnecting part;

a second power connecting-disconnecting part mechanically coupled with the motor generator;

a transmission-input-side rotation-transmitting part mechanically coupling between the second power connecting-disconnecting part and the engine; and a controller electrically coupled with the first power connecting-disconnecting part, the motor generator, and the second power connecting-disconnecting part, wherein the motor generator is mechanically connected to the transmission-output-side rotation-transmitting part via the first power connecting-disconnecting part and to the transmission-input-side rotation part via the second power connecting-disconnecting part such that the motor generator is mechanically connected in parallel with the transmission, when the motor generator starts the engine, the controller disengages the first power connecting-disconnecting part and engages the second power connecting-disconnecting part, to cause the motor generator to perform a power running, when the motor generator performs the power running during a vehicle running, the controller engages the first power connecting-disconnecting part and disengages the second power connecting-disconnecting part, and the motor generator, via the first power connecting-disconnecting part, rotates the drive shaft to drive the vehicle, when the vehicle is decelerated, the controller engages the first power connecting-disconnecting part and disengages the second power connecting-disconnecting part, and the motor generator performs regeneration, and when the vehicle travels by the engine, via the transmission, the controller disengages the first power connecting-disconnecting part and engages the second power connecting-disconnecting part, and the motor generator generates electricity such that a rotation speed and a torque of the engine provide increased engine efficiency.

6. The vehicle hybrid system according to claim 5, wherein

At least one of the first power connecting-disconnecting part and the second power connecting-disconnecting part is an electrically-controlled two-way clutch.

7. The vehicle hybrid system according to claim 5, further comprising:

a transmission part disposed in at least one of a path from the engine via the first power connecting-disconnecting part to the motor generator and a path from the motor generator via the second power connecting-disconnecting part to the drive shaft.

\* \* \* \* \*